United States Patent [19]

Fought

[11] Patent Number: 5,154,251

[45] Date of Patent: Oct. 13, 1992

[54] POWER DRIVEN VEHICLE

[75] Inventor: Gerald E. Fought, Grafton, Ohio

[73] Assignee: Invacare Corporation, Elyria, Ohio

[21] Appl. No.: 614,847

[22] Filed: Nov. 14, 1990

[51] Int. Cl.⁵ .................. B62D 61/00; B62K 15/00
[52] U.S. Cl. .................................. 180/208; 180/210; 180/216; 280/DIG. 5
[58] Field of Search ............... 180/208, 210, 216, 65.1, 180/907; 280/DIG. 5

[56] References Cited

U.S. PATENT DOCUMENTS

| | | | |
|---|---|---|---|
| 3,043,389 | 7/1962 | Steinberg | 180/208 |
| 3,117,648 | 1/1964 | Landreth | 180/55 |
| 4,570,739 | 2/1986 | Kramer | 180/216 |
| 4,944,359 | 7/1990 | Doman et al. | 180/208 |

Primary Examiner—Kenneth R. Rice
Attorney, Agent, or Firm—Fay, Sharpe, Beall, Fagan, Minnich & McKee

[57] ABSTRACT

A three-wheeled scooter having a two part frame assembly defined by first and second frames. The frame assembly uses a mechanical couple to transfer forces through the periphery of the frames. A spring biased pin in the first frame cooperates with apertures in the second frame to lock the frame assembly together. A safety member maintains the pin in a locked position.

14 Claims, 4 Drawing Sheets

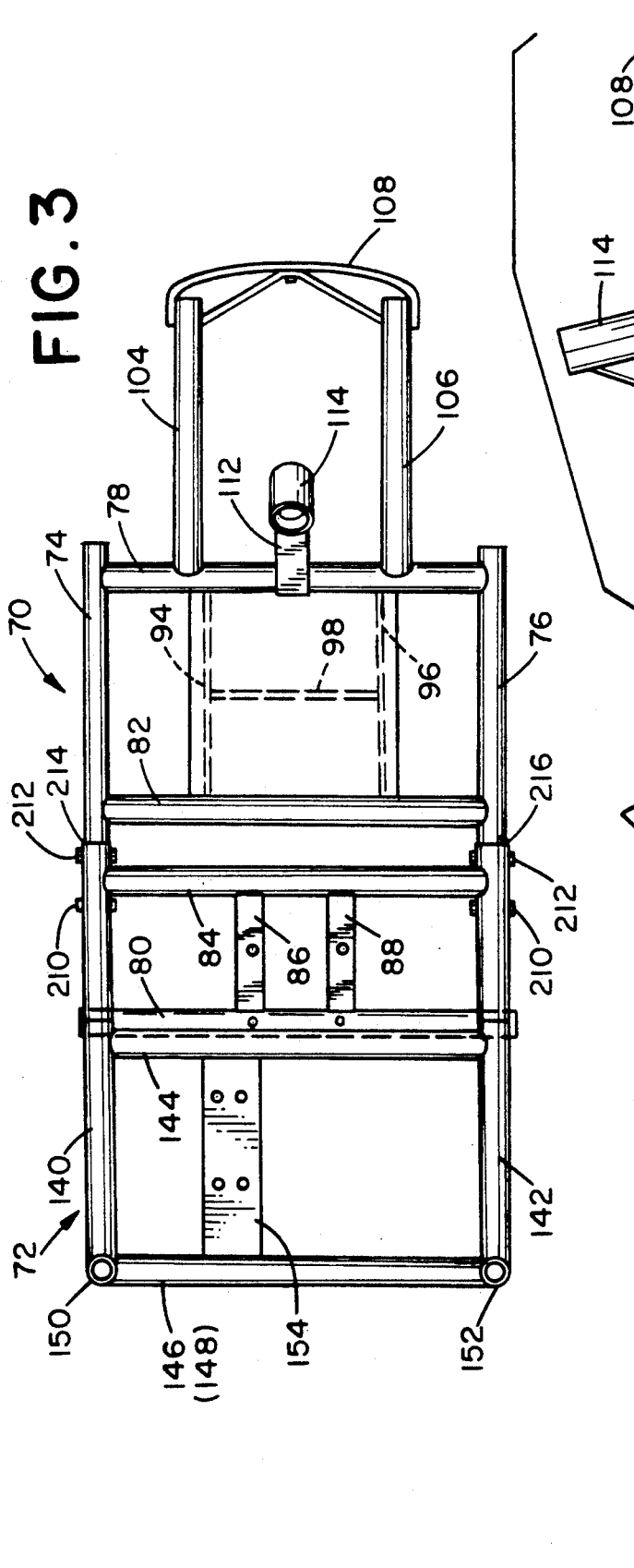

POWER DRIVEN VEHICLE

BACKGROUND OF THE INVENTION

This invention pertains to the art of powered vehicles and more particularly to three-wheeled vehicles or scooters used by partially disabled persons.

The invention is particularly applicable to a two-part frame assembly and structural interconnection between the members and will be described with particular reference thereto. However, it will be appreciated that the invention has broader applications and may be advantageously employed in other environments and applications.

Three-wheeled scooters used by partially disabled persons are well known in the art. For example, U.S. Pat. No. 4,570,739 discloses a three-wheeled scooter of this general type. Generally, these scooters include two rear wheels and a third wheel disposed at the front of the vehicle. In some designs, the front wheel is power driven while in other designs the rear wheels are power driven. Typically, the driven wheel(s) are powered by one or more batteries that are carried by the scooter. The batteries are rechargeable and provide a cost efficient manner of powering the vehicles.

The front wheel is usually steered by a tiller or conventional steering assembly. Means for controlling the motor are mounted on the steering assembly within easy reach of the vehicle operator. Preferably, the seat and steering assembly are adjustable to accommodate different size people and to facilitate ease of storage and transport.

SUMMARY OF THE INVENTION

The present invention contemplates a new and improved power driven vehicle, and particularly a two-part frame therefor, that provides a simple, effective, and economical structure.

According to the subject invention, the vehicle includes a seat, steering assembly, drive means, and two-part frame assembly that transfers forces from one frame part to the other by means of a mechanical couple.

According to another aspect of the invention, the vehicle includes means for locking the frames together.

According to yet another aspect of the invention, the vehicle includes safety means for maintaining the frame means in a locked relationship.

According to still another aspect of the invention, the frame, and likewise the wheelbase may be selectivley extended.

A principal advantage of the invention resides in the lightweight and easy to manufacture components of the powered vehicle.

Another advantage of the invention is found in the ease of assembling the separate frame components together.

Still another advantage results from the distribution of forces along the periphery of the frame assembly.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in this specification and illustrated in the accompanying drawings which form a part hereof, and wherein:

FIG. 3 is a top plan view of the power driven vehicle;

FIG. 4 is a side elevational view of the separate components comprising the frame;

DETAILED DESCRIPTION OF THE PREFERRED EMBODIMENT

Figure 1:
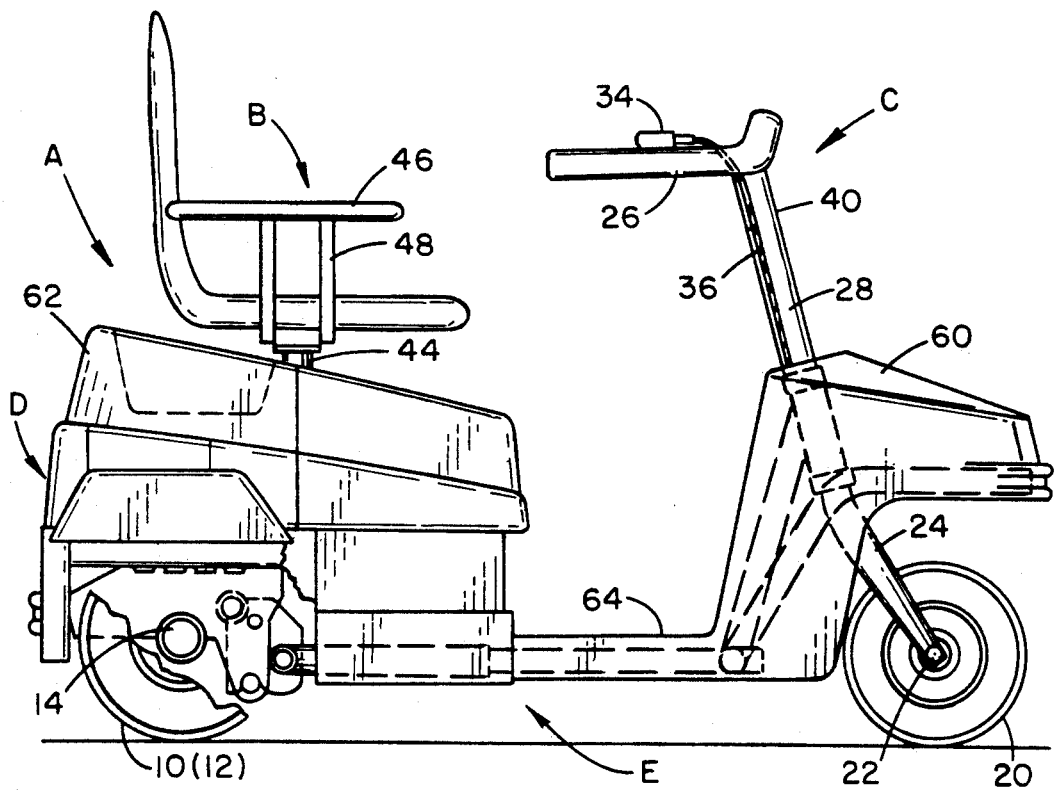
FIG. 1 is a side elevational view of a power driven vehicle in accordance with the subject invention.
Figure 2:
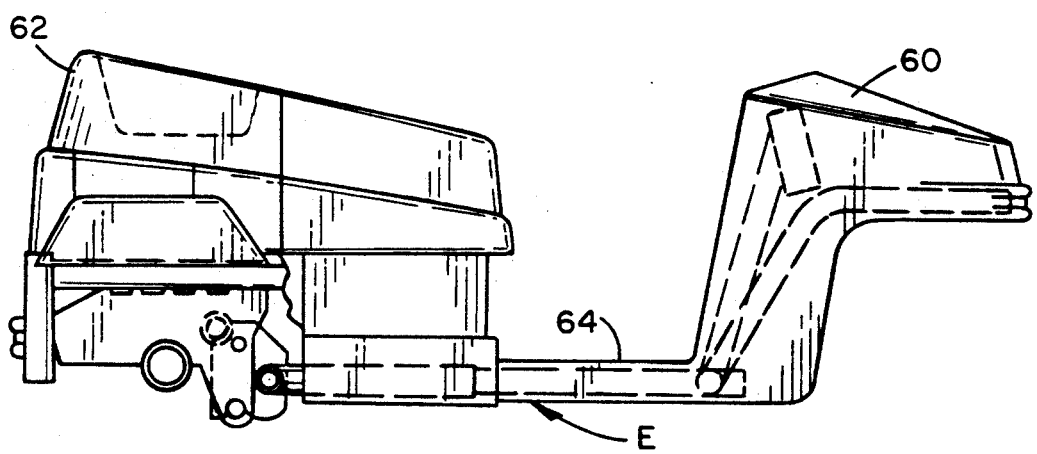
FIG. 2 is a side elevational view of the assembled power driven vehicle of FIG. 1 with selected components removed for ease of illustration.

Referring now to the drawings wherein the showings are for purposes of illustrating the preferred embodiment of the invention only and not for purposes of limiting same, the figures show a power driven vehicle A having a seat B, steering assembly C, and drive unit D. The seat, steering assembly, and drive unit are all interconnected through a two-part frame assembly E.

More particularly, and with reference to FIG. 1, the vehicle A is a three-wheel scooter having first and second small diameter rear wheels 10, 12 rotatable about a common axle 14. A front wheel 20 is substantially the same size as the rear wheels. The front wheel rotates about an axle 22 that is spaced from the axle 14 of the rear wheels. The front wheel and axle is mounted by a fork 24 to steering assembly C in a well known manner. This provides for operator control of the vehicle.

More particularly, the steering assembly includes handle bars 26 secured to a steering column 28 which, in turn, is connected to the front wheel through the fork. As is well known in the art, steering of the front wheel is effected by rotating the handle bars about an axis defined by the steering column. The operator can thus selectively steer the vehicle in any desired direction from right turns, straight ahead, to left turns.

Suitable control means 34 are also mounted on the handle bars to control the powered movement of the vehicle. The control means can be generally described as permitting forward and reverse movement of the vehicle, as well as controlling the velocity or speed. A cable 36 extends from the control means, along the steering column 28, and rearwardly along the frame E to the drive unit D. Since details of such control means are already well known in the art, further description thereof is deemed unnecessary.

Dynamic braking and an automatic park brake are also incorporated into the vehicle. The dynamic brake allows the operator to proceed safely, even down a slope. Further, the park brake automatically engages to hold the vehicle in place. Although incorporated into the vehicle design, the brake mechanism forms no part of the subject iinvention so that further discussion herein is deemed unnecessary.

As will also be understood, the angle of the steering column 28 may be selectively adjusted. This permits the operator to position the handle bars at a comfortable angle. Likewise, the height of the seat B may be adjusted. For example, a pedestal mount 44 secured to the frame at an area adjacent the drive unit D allows selective raising and lowering of the seat to a desired height. Arm rests 46 extend from beneath the seat and are secured by the mounting structure 48. The arm rests are also adapted to flip-up, i.e., into parallel relation with the seat back.

The drive unit D according to the preferred arrangement is adapted to drive the rear wheels 10, 12. One or more drive motors (not shown) is conveniently mounted to the frame E and drives the rear wheels in forward and reverse directions via a transmission assembly (not shown). Powering the motors is typically provided through use of one or more batteries (not shown). The batteries may be conveniently recharged when the vehicle is not in use. Again, details of the drive unit are already well known in the art so that further discussion herein is unnecessary to understand the subject invention.

A shroud or housing 60 is provided adjacent the front end of the vehicle. The housing is secured to the frame assembly E by fasteners, and provides a protective cover for the front wheel and a portion of the steering assembly. In a similar manner, a housing or cover 62 extends over the drive unit D, batteries and rear wheels. The housing 62 shields the operator from the drive unit, as well as providing an aesthetic appearance to the vehicle. Each of the housings 60, 62 can be removed from the vehicle if maintenance and/or replacement is required.

Additionally, a generally planar platform 64 covers the frame assembly E. Particularly, the platform is secured to a rear peripheral portion of the front housing 60 and extends rearwardly toward the housing 62. The platform provides a generally continuous, stable surface to support the operator's feet.

With continued reference to FIG. 1, and additional reference to FIGS. 2-7, the frame assembly will be more particularly described. The frame assembly is comprised of two frame components, namely, a first or front frame 70 and a second or rear frame 72. The front frame includes first and second longitudinally extending members 74, 76 that are interconnected at the opposite ends by first and second lateral members 78, 80. Preferably, two additional lateral members 82, 84 are generally equally spaced along the longitudinal members and extend therebetween to provide additional support. Each of these longitudinal and lateral members 74 through 84 is formed from metal tubing and secured together by any suitable means, such as a welded interconnection. Of course other materials and alternative means of securing the members may be used without departing from the scope and intent of the subject invention.

Because of the weight imposed by the batteries, additional longitudinal members 86, 88 extend between the lateral members 80, 84. Likewise, a generally H-shaped bracing comprised of two longitudinal members 94, 96 and a lateral member 98 extends between the lateral members 78, 82.

Extending angularly outwardly from the lateral frame member 78 are two bent members 104, 106. Preferably, the bent members are each welded at their first ends to the lateral member 78 and are connected to one another at their outer or distal ends by an interconnecting member 108. The bent members, in combination with the interconnecting member, provide a rigid, stable support for the front housing 60.

Additionally, a tube 112 having a rectangular cross section is disposed between the bent members 104, 106. The tube 112 also extends from the lateral member, although at a slightly different angle than the bent members. The tube has a sleeve 114 secured to its free end that is adapted to receive the lower end of the steering column 28. In this manner, forces imposed on the steering assembly are transferred to the frame assembly through the tube 112.

Adjacent the rear end of the first frame, is mounted a first flange means defined by first and second spaced flanges 120, 122. The flanges are constructed from rigid metal sheet and are fixedly secured to lateral member so, preferably adjacent the opposite ends thereof. An additional tubular cross member 124 extends between the flanges and is slightly offset from the plane defined by the remainder of the first frame. Further details of the structure and operation of the cross member 124 will become more apparent below.

Figure 5:
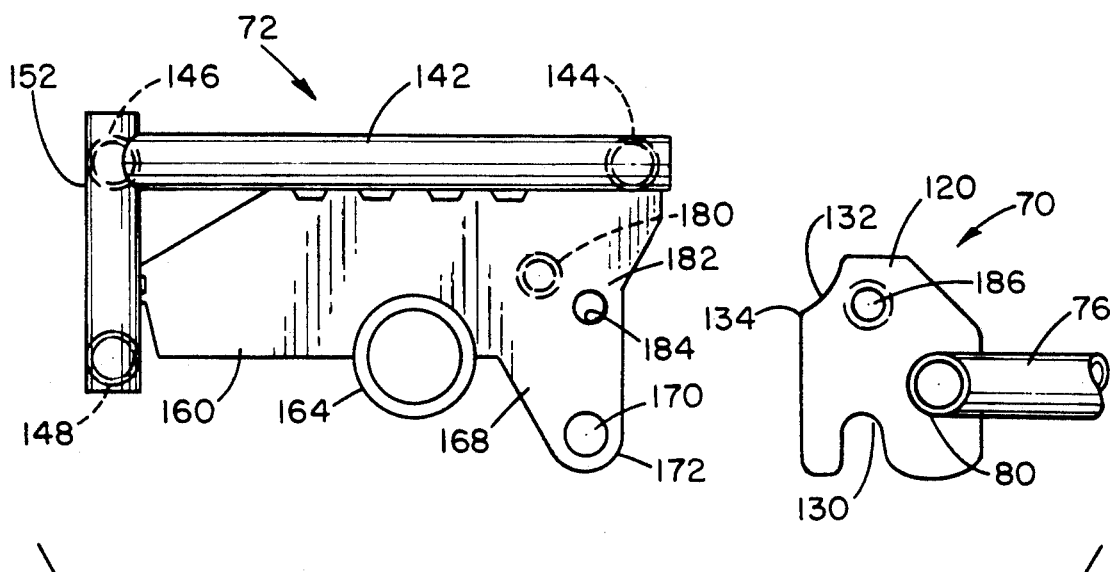
FIG. 5 is an enlarged, detailed view of the disassembled components of FIG. 4.
Figure 6:
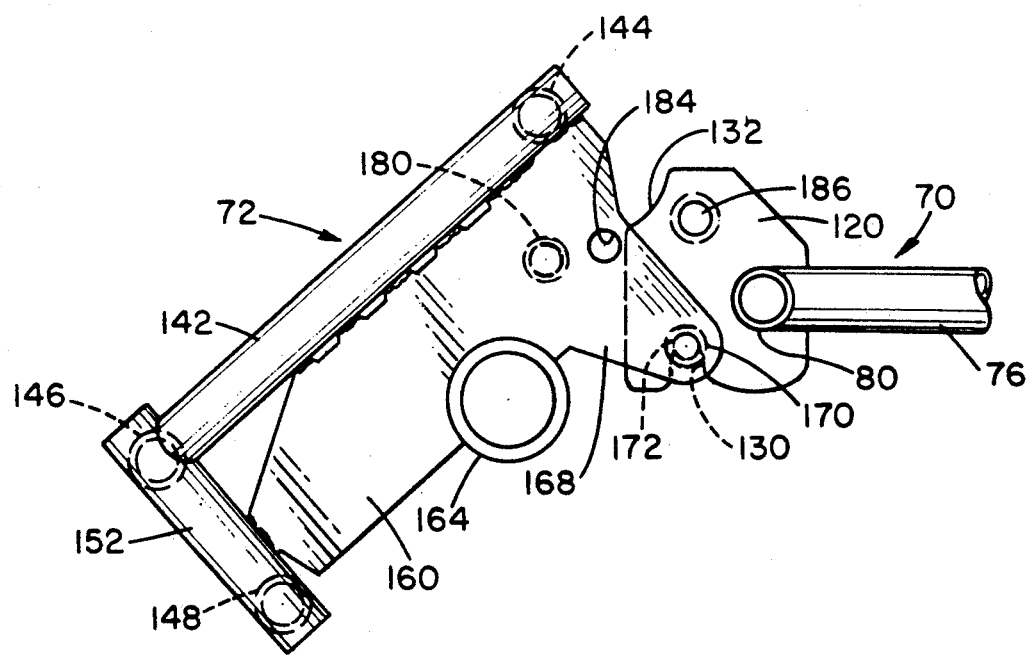
FIG. 6 is an enlarged, detailed view similar to FIG. 5 and illustrating the initial steps of assembling the components.
Figure 7:
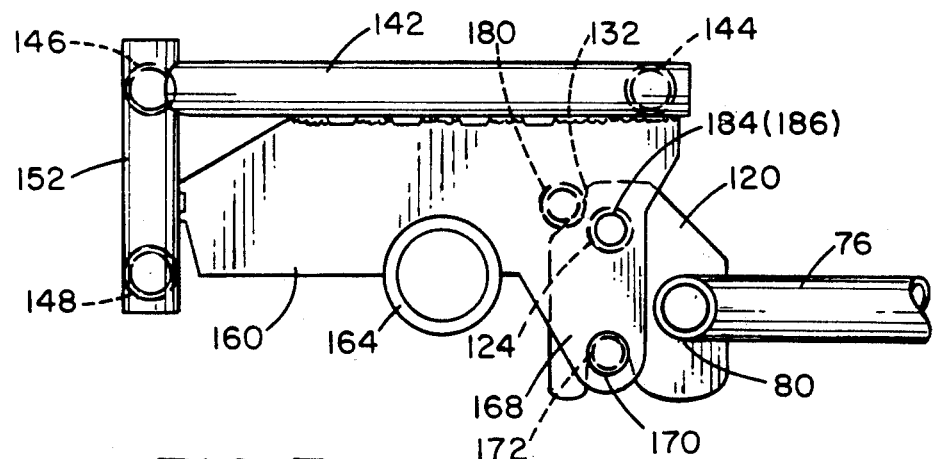
FIG. 7 is an enlarged, detailed view of the completely assembled components of FIG. 5.
Figure 8:
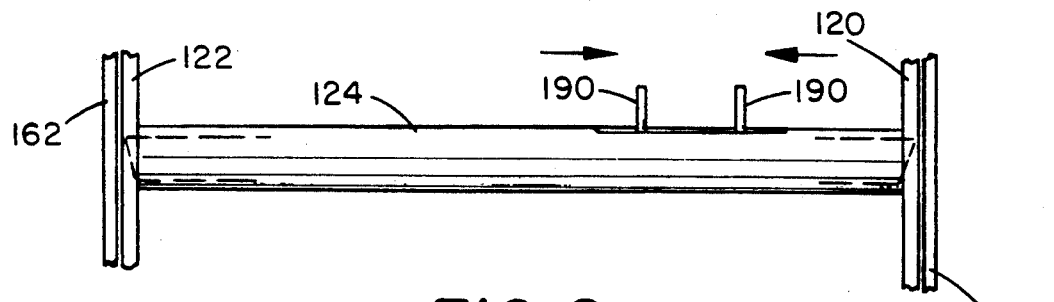
FIG. 8 is an enlarged plan view particularly illustrating the unlocked position of the locking means; and, FIG. 9 is a plan view illustrating the locking means in a locked position, as well as safety means for maintaining the locked arrangement.

As best illustrated in FIGS. 5-7, the flanges are identical in configuration so that description of one is equally applicable to the other. Flange 120 includes a recess 130 that is generally U-shaped, the open end of which faces the ground surface. Additionally, a second recess 132 is defined in flange at an upper corner thereof. The second recess has a generally stepped configuration, with a smoothly rounded corner 134 that merges the recess with the rear edge of the flange.

The second frame 72 includes first and second longitudinal members 140, 142 maintained in spaced, parallel relation by first and second lateral members 144, 146. A third lateral member 148 extends between two vertical members 150, 152. Still further, a longitudinal brace member 154 extends between the lateral members 144, 146 to aid in mounting the drive motor and transmission of the drive unit D.

In the plane defined by the longitudinal members 140, 142 and the vertical members 150, 152 is a second flange means defined by spaced first and second flanges 160, 162. The flanges 160, 162 are welded along their edges to the longitudinal members 140 and 142, respectively, and along a rear edge to the vertical members 150 and 152, respectively. Again, each flange is substantially identical is structure so that description of flange 160 is applicable to flange 162 unless particularly noted otherwise. Opening 164 is defined in the flange and adapted to receive the axle 14 and associated bearing structure to rotatably support the rear wheels.

Extending downwardly from the flange 160 is an extension or projection 168. On an interior face of the projection is a protrusion 170 having a necked down region 172. Similarly, a stop member 180 has a necked down region 182. The stop member is disposed above and rearwardly of the protrusion for reasons which will become more apparent below. An aperture 184 is also defined in the flange and, in part, defines a locking means.

More particularly, and with references to FIGS. 5-7, the interaction of the flanges 120, 160 and 122, 162 will be described in greater detail. Preferably, the second frame 72 is rotated so that protrusions 170, particularly the necked down regions 172, are adapted for receipt in generally U-shaped recesses 130 in flanges 120, 122. The protrusions of the second frame are inserted into the U-shaped recesses until the necked down regions bottom out on the flanges 120 and 122. Thereafter, the second frame member is rotated about this interconnection (in a clockwise direction as shown). The rotation continues until the stop members 180, particularly the necked down regions 182, engage the flanges 120 and 122 at recesses 132.

Figure 9:
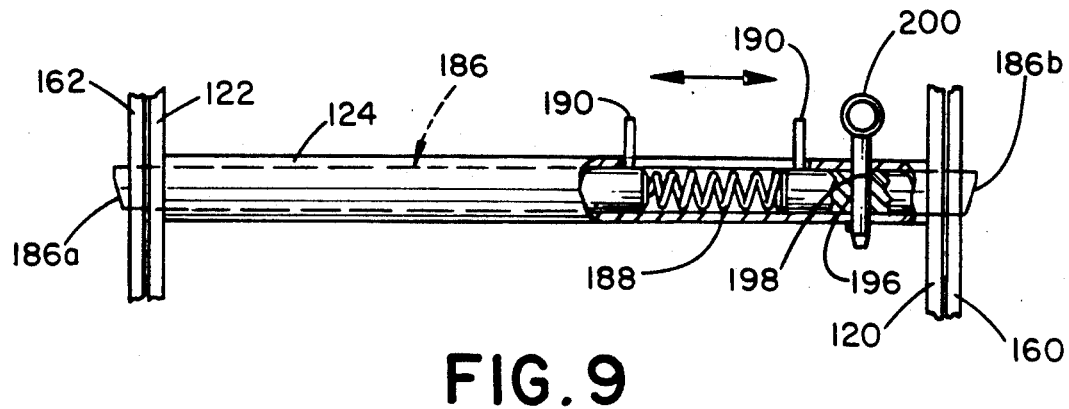

During this rotational movement, the apertures 184 in flanges 160, 162 cooperate with a biased pin 186 disposed in the cross member 124. In the preferred arrangement, the pin 186 is actually defined by two pin members 186a, 186b having a spring 188 interposed therebetween (FIG. 9). The spring urges the pins 186a, 186b beyond the faces of the flanges. The pins can either be manually retracted, by compressing the spring via pegs 190, or continued rotation of the second frame will urge the pins inwardly into cross member 124. That is, the outer ends of the pins include a tapered configuration that assists the flanges 160, 162 in riding over the pins and depressing them inwardly into the cross member 124. Once the apertures 184 are aligned with the pins, the biasing force of the spring 188 urges the pins outwardly through the apertures and locks the first and second frames together. Thus, the first and second frames are locked together to define a single frame assembly.

A safety means is defined by a transverse opening 196 that extends through the pin in a direction perpendicular to the axial movement of the pin. An opening 198 is also provided diametrically through the cross member 124, and aligns with the Opening 196 in the pin 186b when it is disposed in an outwardly biased position. These aligned openings are adapted to receive a safety member 200 sized to fit through the aligned openings. This assures that the pin 186b is not inadvertently retracted, which might otherwise permit the second frame to rotate away from its assembled position.

As will be apparent from this description, the protrusions, stop members, and flanges provide a moment or couple along the lateral edges of the frame assembly. This couple provides for an even distribution of forces through the flanges and likewise through the frame assembly. Additionally, weight imposed by the vehicle, and by the operator when he is seated in the powered vehicle, will tend to urge the first and second frames toward the assembled position shown in FIG. 7.

Still another advantageous feature of the frame is the ability to alter its longitudinal dimension a total of four inches, in two inch increments. This, in turn, changes the wheelbase by a like amount, and more importantly provides greater foot space on the platform. A smaller wheelbase, on the other hand, provides a smaller turning radius that may be required in certain environments.

The frame assembly shown in FIG. 3 demonstrates the shortest wheelbase attainable with this frame, which is approximately 30 inches. To extend the length of the frame assembly, the longitudinal members 74, 76 may be expanded by removing fasteners 210, 212 from either side of the lateral member 84 and sliding telescoped portions 214, 216 from enlarged diameter portions of the longitudinal members 74, 76. The telescoped portions include spaced openings therein adapted to receive the fasteners 210, 212. In this manner, an operator can select a desired wheelbase of 30, 32 or 34 inches without the need of any additional components.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A frame for a power driven vehicle used by partially disabled persons for mobility, the frame comprising:
   a first member having means for receiving at least one steering wheel and associated mechanism, and means for receiving a seat;
   a second member having means for receiving an associated drive mechanism and means for rotatably receiving a drive wheel;
   connection means for selectively interconnecting the first and second members, the connection means including first and second flanges secured to the first and second members, respectively, one of the first and second flanges including means for pivoting the other of the first and second flanges about a pivot axis, and a stop member on the one of the first and second flanges limiting the range of pivotal movement therebetween; and,
   means for locking rotation of the first and second flanges against the stop member including a pin movable along an axis parallel to the pivot axis and means for continuously urging the pin toward a locked position.

2. The frame as defined in claim 1 wherein the first flange includes a generally U-shaped recess defined therein and the pivoting means includes a projection having a rounded surface operatively cooperating with the recess.

3. The frame as defined in claim 1 wherein the flanges are substantially perpendicular to the pivot axis.

4. The frame as defined in claim 1 wherein the first flange includes a generally U-shaped recess and a shoulder spaced therefrom, the pivoting means and stop member defined on the second flange and being selectively received in the U-shaped recess and shoulder, respectively.

5. The frame as defined in claim 1 further comprising a safety means associated with the locking means for maintaining the locking means in a locked position.

6. The frame as defined in claim 5 wherein the safety means includes a second pin that extends transverse to the pivot axis.

7. A power driven vehicle providing mobility for infirm persons, the vehicle comprising:
   a frame defined by first and second members, the frame having a lower surface and a generally planar upper surface, means adapted for mounting a steering tiller in the upper surface, means adapted for mounting a seat in the upper surface, and means adapted for mounting first, second and third wheels to the lower surface;
   first, second and third wheels rotatably secured to the frame;
   a steering tiller operatively associated with the first wheel;
   means for driving the second and third wheels;
   a seat extending outwardly from the frame upper surface;
   a connection means for interconnecting the first and second members together, the connection means including means for transferring forces through a couple; and, means for locking the first and second members together including a pin biased by a spring and mounted on one of the first and second members and an opening in the other of the first and second members, the pin being selectively movable between a locked position extending through the opening and an unlocked position retracted from the opening, and a tapered portion on the end of the pin that assists the other of the first and second members in depressing the pin against the spring bias whereby the pin is then biased outwardly and through the opening when aligned therewith to lock the frame members together.

8. The vehicle as defined in claim 7 wherein the transferring means includes a recess defined on one of the first and second members, and projection and a stop member defined on the other of the first and second members, the projection adapted for receipt in the recess and the stop member abutting the one of the first and second members to limit pivotal movement.

9. The vehicle as defined in claim 7 further comprising means for selectively extending the length of the wheelbase.

10. A three-wheeled, power driven vehicle for use by persons who are at least partially infirm, the vehicle comprising:
 a frame having first and second members that are selectively connectable together, the first member including a first wheel that is steerable and means for steering the first wheel, the second member including second and third wheels and a seat;
 means for driving at least one of the first, second and third wheels;
 connection means for selectively interconnecting the first and second members together including spaced first and second flanges on the first member, and spaced third and fourth flanges on the second member, the first and second flanges each including a recess adapted to receive a projection from each of the third and fourth flanges, respectively, and also including first and second stop members defined on the third and fourth flanges and being spaced from the projections, the stop members selectively abuttingly engaging the first member to limit pivoting movement and align the first and second members to define a continuous platform surface; and,
 means for locking the first and second flanges to the third and fourth flanges, including a pin operatively connected to the first flange and biased by a spring for selective engagement with the third flange, the pin including a tapered portion that assists the third flange in riding over the pin and depressing the pin against the spring bias whereby the pin then locks the first and third flanges together.

11. The vehicle as defined in claim 10 wherein the second and third wheels are driven by a motive means carried by the second member.

12. The vehicle as defined in claim 10 wherein the second member has a substantially smaller longitudinal dimension than the first member.

13. The vehicle as defined in claim 10 wherein the recesses in the first and second flanges, the projections in the third and fourth flanges, and the stop members are spaced so that the first and second members rotate through an angle of approximately 90 to a locked position.

14. The vehicle as defined in claim 10 further comprising means for retaining the locking means in a locked position.

* * * * *